(12) United States Patent
Aragon et al.

(10) Patent No.: US 8,678,465 B1
(45) Date of Patent: Mar. 25, 2014

(54) VEHICLE SEAT WITH MULTI-AXIS ENERGY ATTENUATION

(75) Inventors: Loren K. Aragon, Maricopa, AZ (US); Terry Wilhelm, Gilbert, AZ (US); D. Brent Noel, Orem, UT (US); Joshua Platt, Concord, CA (US)

(73) Assignee: Armorworks Enterprises LLC, Chandler, AZ (US)

( * ) Notice: Subject to any disclaimer, the term of this patent is extended or adjusted under 35 U.S.C. 154(b) by 243 days.

(21) Appl. No.: 13/187,701

(22) Filed: Jul. 21, 2011

(51) Int. Cl.
*B62D 25/06* (2006.01)

(52) U.S. Cl.
USPC .................... 296/68.1; 244/122 R; 297/216.1

(58) Field of Classification Search
USPC .................. 296/68.1; 244/122 R; 297/216.1, 297/216.13, 216.15, 216.16, 216.17, 297/216.18, 216.19
See application file for complete search history.

(56) References Cited

U.S. PATENT DOCUMENTS

| | | | |
|---|---|---|---|
| 3,968,863 A | 7/1976 | Reilly | |
| 4,349,167 A | 9/1982 | Reilly | |
| 4,440,441 A | 4/1984 | Marrujo | |
| 5,125,598 A | 6/1992 | Fox | |
| 5,676,336 A | 10/1997 | Nefy | |
| 5,788,185 A | 8/1998 | Hooper | |
| 6,561,580 B1 | 5/2003 | Bergey | |
| 6,585,190 B2 | 7/2003 | Mort | |
| 7,445,181 B2 | 11/2008 | Knoll | |
| 7,513,558 B2 | 4/2009 | Hansen | |
| 2007/0273192 A1* | 11/2007 | Van Druff et al. | 297/339 |

* cited by examiner

*Primary Examiner* — Joseph Pape
(74) *Attorney, Agent, or Firm* — James L. Farmer

(57) ABSTRACT

Methods and apparatus are provided for an energy attenuating seat assembly with multi-axis energy attenuation. In one embodiment the seat assembly comprises a seat with a back, a first energy attenuating support comprising a first seat guide, and a first energy attenuating link, the first energy attenuating support operatively disposed in a first direction with respect to the seat. The exemplary seat assembly further comprises a second energy attenuating support comprising a second seat guide, and a second energy attenuating link, the second energy attenuating support operatively disposed in a second direction with respect to the seat.

14 Claims, 13 Drawing Sheets ic" generally to the Z direction, and "vertical" generally to the Y direction.

VEHICLE SEAT WITH MULTI-AXIS ENERGY ATTENUATION

TECHNICAL FIELD AND BACKGROUND

The instant invention relates to devices and systems adapted to provide shock attenuated support for a body subjected to relative acceleration or impact with respect to a supporting surface or object. Such devices and systems may include for example energy attenuating seats for use in military vehicles and aircraft.

DESCRIPTION OF THE EMBODIMENTS

Figure 1:
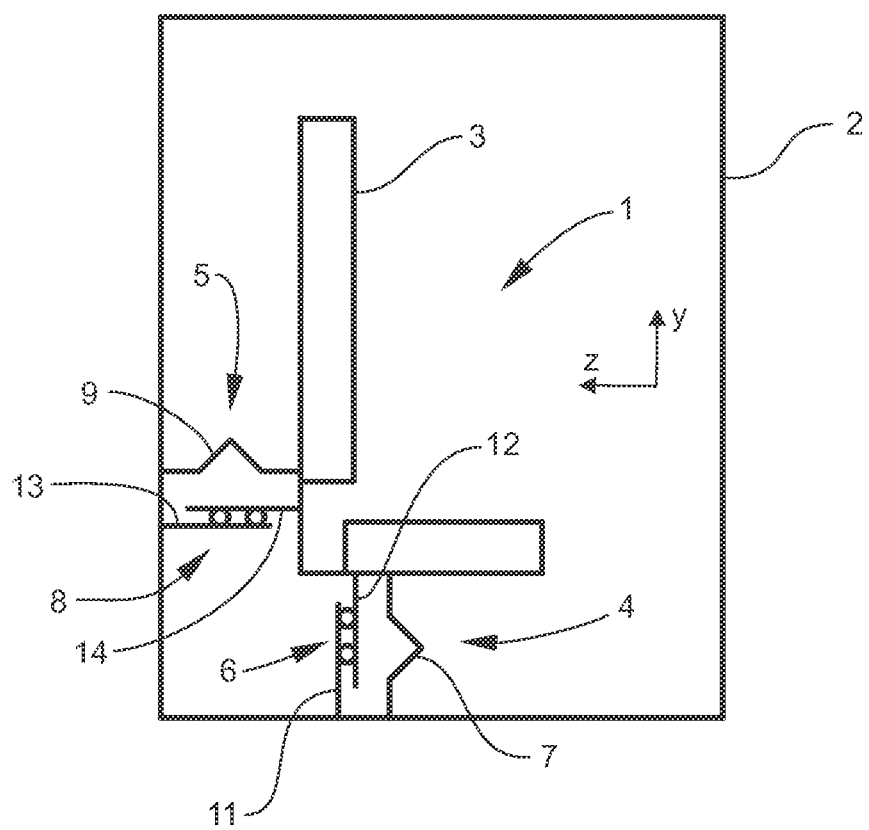
FIG. 1 is a schematic view of an energy attenuating seat with multi-axis energy attenuation.

The instant invention is described more fully hereinafter with reference to the accompanying drawings and/or photographs, in which one or more exemplary embodiments of the invention are shown. This invention may, however, be embodied in many different forms and should not be construed as limited to the embodiments set forth herein; rather, these embodiments are provided so that this disclosure will be operative, enabling, and complete. Accordingly, the particular arrangements disclosed are meant to be illustrative only and not limiting as to the scope of the invention. Moreover, many embodiments, such as adaptations, variations, modifications, and equivalent arrangements, will be implicitly disclosed by the embodiments described herein and fall within the scope of the present invention.

Although specific terms are employed herein, they are used in a generic and descriptive sense only and not for purposes of limitation. Unless otherwise expressly defined herein, such terms are intended to be given their broad ordinary and customary meaning not inconsistent with that applicable in the relevant industry and without restriction to any specific embodiment hereinafter described. As used herein, the article "a" is intended to include one or more items. Where only one item is intended, the term "one", "single", or similar language is used. When used herein to join a list of items, the term "or" denotes at least one of the items, but does not exclude a plurality of items of the list. Terms such as "connected" or "attached" as used herein are intended to denote direct, indirect (with intermediate elements), rigid, and flexible linking arrangements, as well as linking arrangements with one or more degrees of freedom. The term "vehicle" as used herein is intended to mean any person carrying structure, including but not limited to all types of land vehicles, aircraft, watercraft, rockets, spacecraft, and the like. As used herein, the term "aircraft" is intended to denote any airborne vehicle including but not limited to airplanes, jets, gliders, helicopters, and lighter-than-air craft.

For exemplary methods or processes of the invention, the sequence and/or arrangement of steps described herein are illustrative and not restrictive. Accordingly, it should be understood that, although steps of various processes or methods may be shown and described as being in a sequence or temporal arrangement, the steps of any such processes or methods are not limited to being carried out in any particular sequence or arrangement, absent an indication otherwise. Indeed, the steps in such processes or methods generally may be carried out in various different sequences and arrangements while still falling within the scope of the present invention.

Additionally, any references to advantages, benefits, unexpected results, or operability of the present invention are not intended as an affirmation that the invention has been previously reduced to practice or that any testing has been performed. Likewise, unless stated otherwise, use of verbs in the past tense (present perfect or preterit) is not intended to indicate or imply that the invention has been previously reduced to practice or that any testing has been performed.

Energy attenuating seats, also referred to as EA seats, are typically employed to mitigate severe shock loads transmitted to a seated occupant during an under vehicle mine blast, helicopter crash, or other event involving high, instantaneous relative acceleration between the seat and the structure supporting the seat. Many EA seats utilize some form of crushable member between the seat and the structure supporting the seat to absorb the energy of a so-called "slam down" event. The seat is typically configured to stroke in the direction of the anticipated shock load, such as toward the floor of a vehicle or aircraft. EA seats are disclosed in issued U.S. Pat. No. 7,938,485, and co-pending U.S. patent application Ser. No. 12/806,373, both assigned to the assignee of the instant invention, and both hereby incorporated by reference.

For convenience, the following conventions will be used herein to describe orientations and directions. Referring to the Cartesian coordinate axes denoted on the drawing Figures, words such as "forward", or "front" refer to the negative Z direction; words such as "rearward", "rear" and "back" refer to the positive Z direction; words such as "up", "upward", or "top" refer to the positive Y direction; words such as "down", "downward", or "bottom" refer to the negative Y direction; "right" refers to the positive X direction; and "left" refers to the negative X direction. In addition, words such as "lateral" or "sideways" refer generally to the X direction, "longitudinal" refers generally to the Z direction, and "vertical" refers generally to the Y direction. Other orientation or direction related words used herein but not listed above should be given their customary meaning not inconsistent with these conventions. Further, the association of words to particular coordinate axes is intended to provide general directions and orientations, and unless otherwise noted is not necessarily intended to require precise alignment with any coordinate direction.

FIG. 1 is a schematic representation of an EA seat assembly 1 mounted to or within a moveable structure 2. The moveable structure 2 may be an exposed or enclosed portion of any moveable vehicle or object that is potentially subject to linear acceleration. The exemplary EA seat assembly 1 comprises a seat 3 supported in a substantially vertical direction by a vertical EA support 4, and supported in a substantially horizontal direction by a horizontal EA support 5. The vertical EA support 4 comprises a vertical seat guide 6 adapted to allow for guided vertical movement of seat 3, and a vertical EA link 7 supporting the seat in a vertical direction. Similarly, the horizontal EA support 5 may comprise a horizontal seat guide 8 adapted to allow for guided horizontal movement of seat 3, and a horizontal EA link 9 supporting the seat in a horizontal direction. The seat guides 6, 8, comprise fixed portions, 11 and 13 respectively, that are connected directly or indirectly to the structure 2, and moving portions, 12 and 14 respectively, that are connected directly or indirectly to the seat 3. The vertical EA support 4 may be compliant or moveable in a horizontal direction to accommodate horizontal movement of seat 3 relative to structure 2, and the horizontal EA support 5 may be compliant or moveable in a vertical direction to accommodate vertical movement of seat 3 relative to structure 2.

Figure 2:
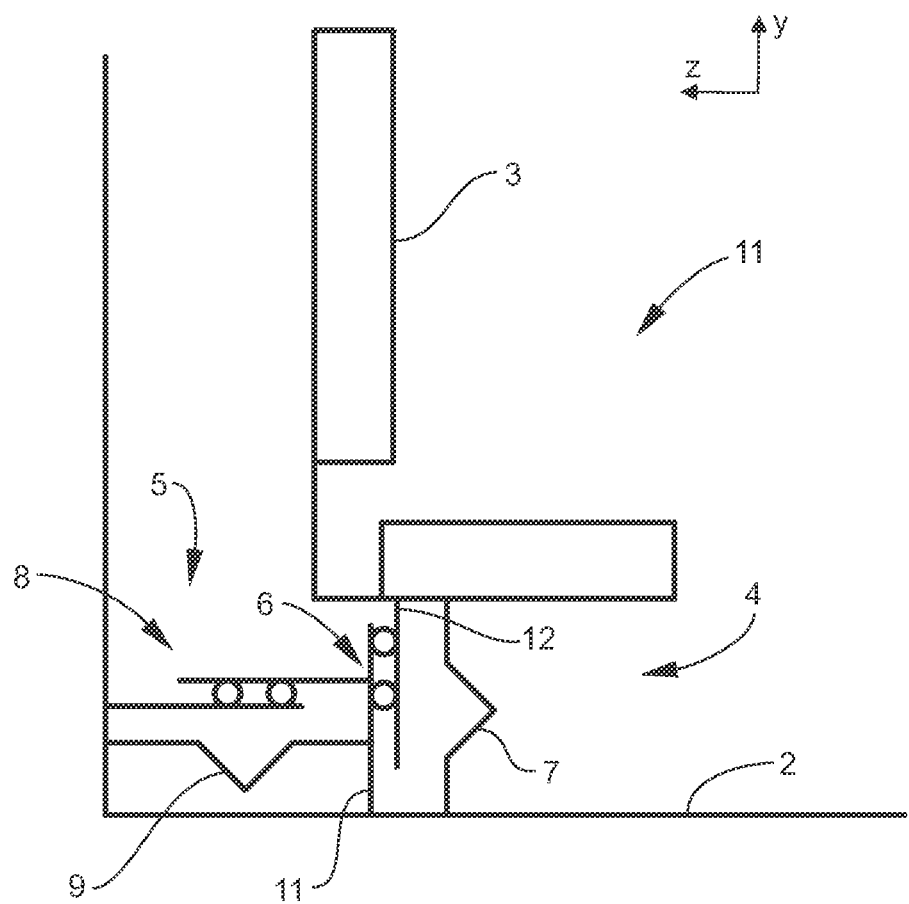
FIG. 2 is schematic view of another embodiment of an energy attenuating seat with multi-axis energy attenuation.

FIG. 2 is another schematic depiction of an EA seat assembly 11, again disposed in or on a moveable structure 2, and comprising a seat 3 supported by vertical and horizontal EA supports 4 and 5. The horizontal EA support 5 is connected directly or indirectly at one end to the structure 2, and directly or indirectly at the other end to the vertically fixed portion 11 of the vertical EA support 4. The horizontal EA support 4 in this embodiment is thus independent of, and unaffected by vertical movement of the seat 3. The vertical EA support 4 may again be compliant or moveable in a horizontal direction to accommodate horizontal movement of seat 3 relative to structure 2. In addition, the vertical EA support 4 may be vertically supported entirely by the horizontal EA support 5, instead of by the external structure 2 as suggested by FIG. 2.

The EA links 7, 9, may each comprise one or more crushable or extensible members that are rigid and strong enough to support the weight and G-loads of an occupied seat 3 under non-extreme accelerations without significant deformation. The EA links 7, 9, may, for example, be elongated bars with multiple bends and straight sections, and comprise any generally deformable metal, such as aluminum or steel. Additional suitable designs based on metal bars are disclosed in the above mentioned US patents and patent applications owned by the assignee of the present invention, as well as U.S. Design patent application Ser. No. 29/386,211, also assigned to the assignee of the instant invention, the entire contents of which are hereby incorporated by reference. Alternatively, EA links 7, 9, can be one or more of any other crushable or extensible EA structure known in the art, such as crush tubes and the like.

Figure 3:
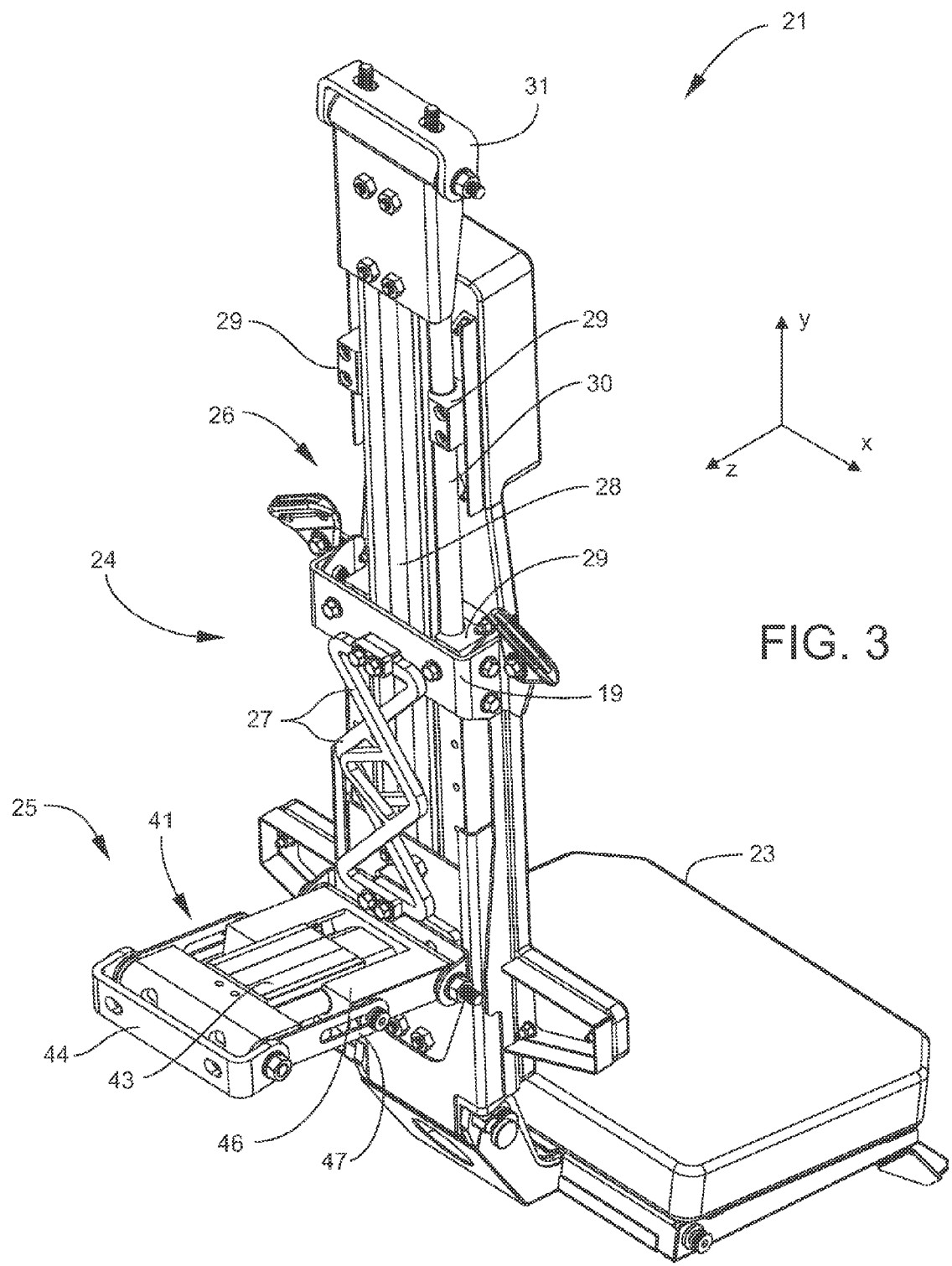
FIG. 3 is a back perspective view of another embodiment of an energy attenuating seat assembly with multi-axis energy attenuation.
Figure 4:
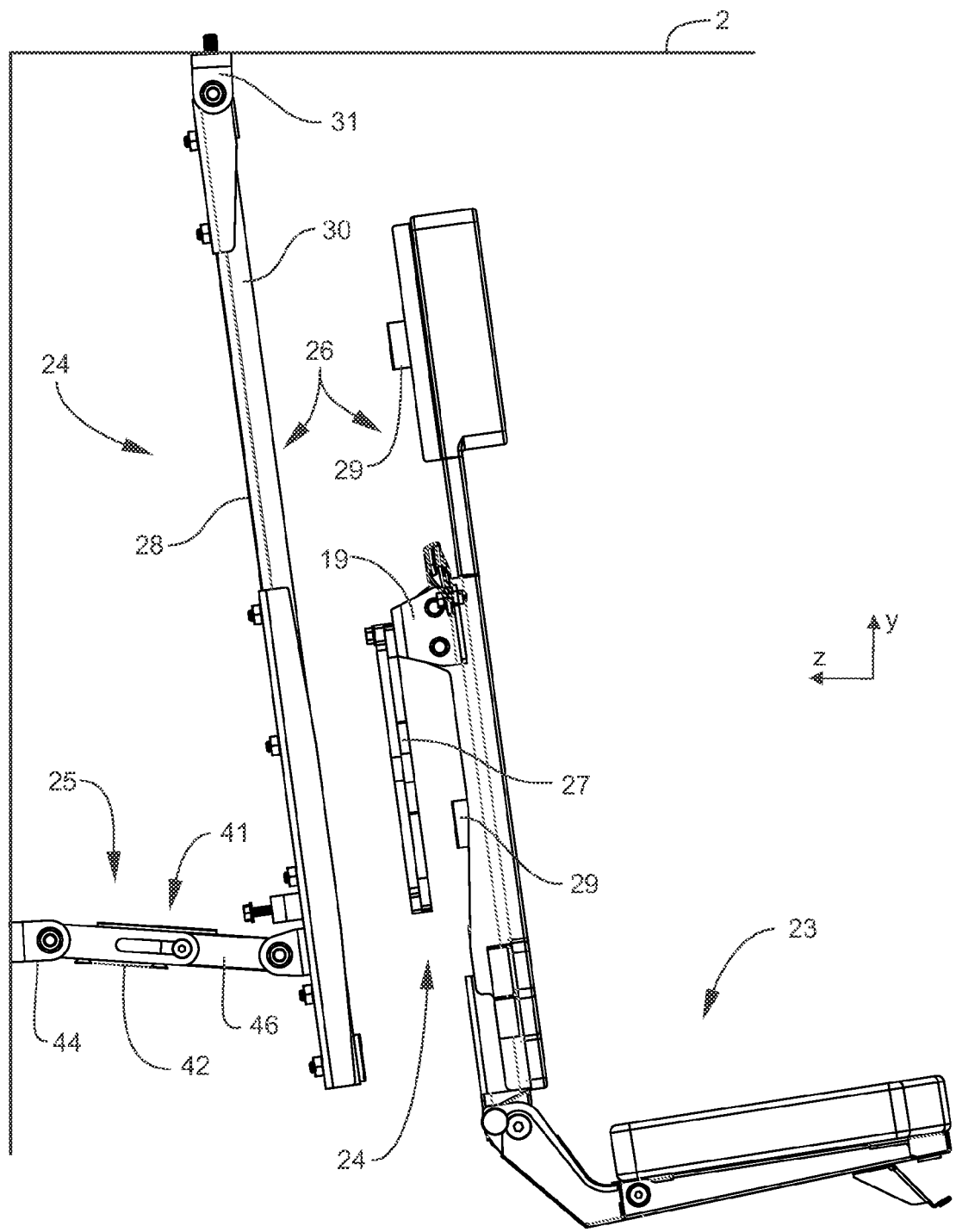
FIG. 4 is a partially exploded side view of the energy attenuating seat assembly of FIG. 3.

FIGS. 3 and 4 depict another embodiment of an exemplary EA seat assembly 21 comprising a seat 23 supported by vertical EA support 24 and horizontal EA support 25. The vertical EA support 24 comprises a vertical seat guide 26 and a vertical EA link 27. The vertical seat guide 26 includes, in part, a seat guide rail 28, the upper end of which is connected with a hinged mount bracket 31 to a portion of structure 2, such as a ceiling or overhead beam. The vertical seat guide 26 further includes a series of aligned bushings 29 mounted to the back of the seat 23, and positioned to slidably engage left and right guide bars 30 that form the left and right lateral edges of seat guide rail 28. The bushings 29 thus provide for guided sliding movement of seat 23 in a generally vertical direction along guide rail 28. The vertical EA link 27 is connected at its upper end to seat 23 via an upper EA bracket 19 that extends around and behind seat guide rail 28. The lower end of vertical EA link 27 is fixedly attached to guide rail 28, for example with suitable bolts and spacers as shown.

Figure 5:
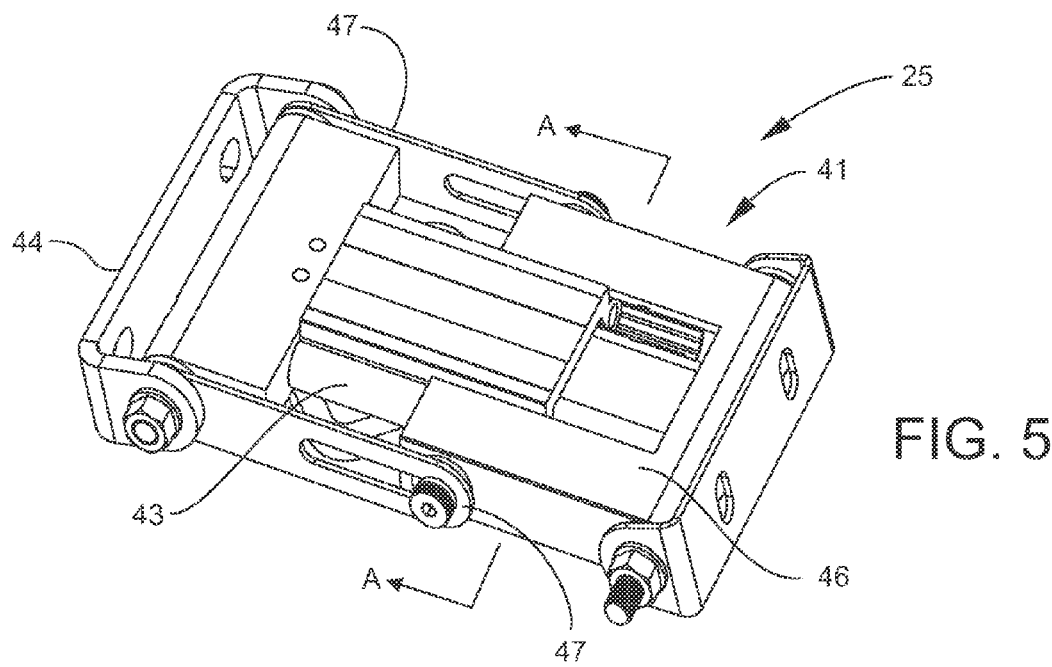
FIG. 5 is a top perspective view of an energy attenuating support of the seat assembly shown in FIG. 3.
Figure 6:
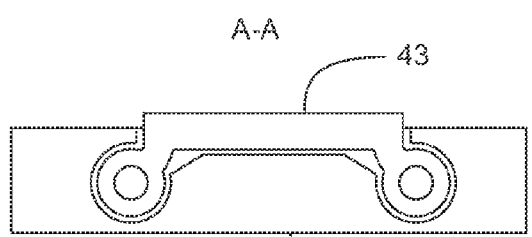
FIG. 6 is a cross section of the energy attenuating support of FIG. 5.
Figure 7:
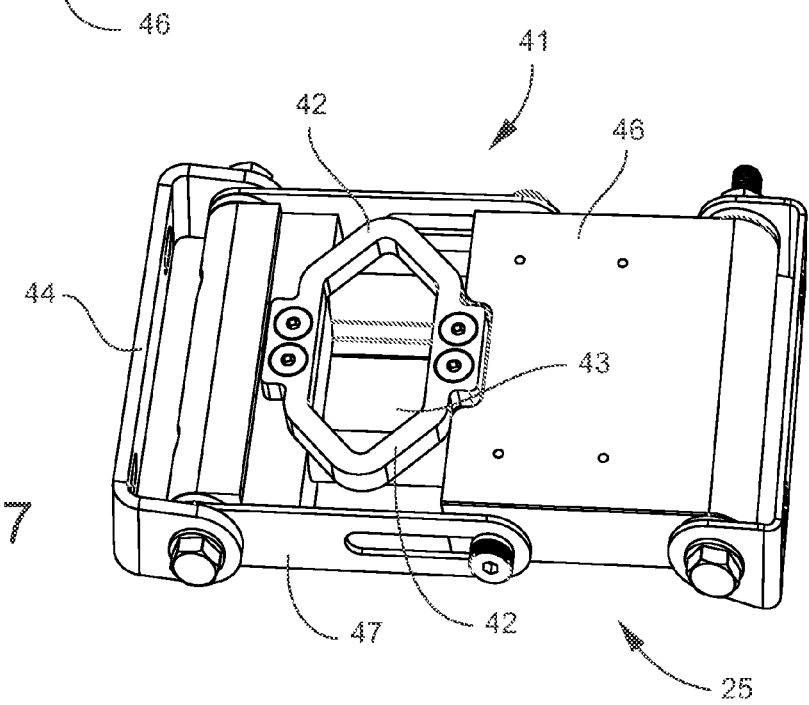
FIG. 7 is a bottom perspective view of the energy attenuating support shown in FIG. 5.

Referring to FIGS. 5 through 7, the horizontal EA support 25 comprises a horizontal seat guide 41, and a horizontal EA link 42. The horizontal seat guide 41 includes a horizontal guide rail 43 attached to structure 2 through a hinged mount bracket 44. A longitudinally moveable portion of horizontal seat guide 41, comprising a grooved slider block 46, is attached at one end to the seat guide rail 28. The slider block 46 is oriented such that the open end of the groove faces rearward, away from the seat, and slidably engages the outer edges of horizontal guide rail 43. Accordingly forward and rearward movement of seat 23 and seat guide rail 28 causes slider block 46 to slide along guide rail 43, increasing or decreasing the overall length of EA support 25. Extension limit bars 47 on either side of EA support 25 prevent the guide rail 43 from over-extending and disengaging with slider block 46. The horizontal EA link 42 is connected at one end to horizontal guide rail 43, and at the other end to slider block 46, preventing horizontal movement of seat 23 under non-extreme acceleration conditions. Under severe longitudinal impact conditions, horizontal EA link 42 deforms in a controlled manner to absorb the imparted energy without injury to a seated occupant. The EA link 42 may comprise square metal bars in a diamond configuration as depicted, or alternatively any of the previously described shapes or types of crushable structures.

Figure 8:
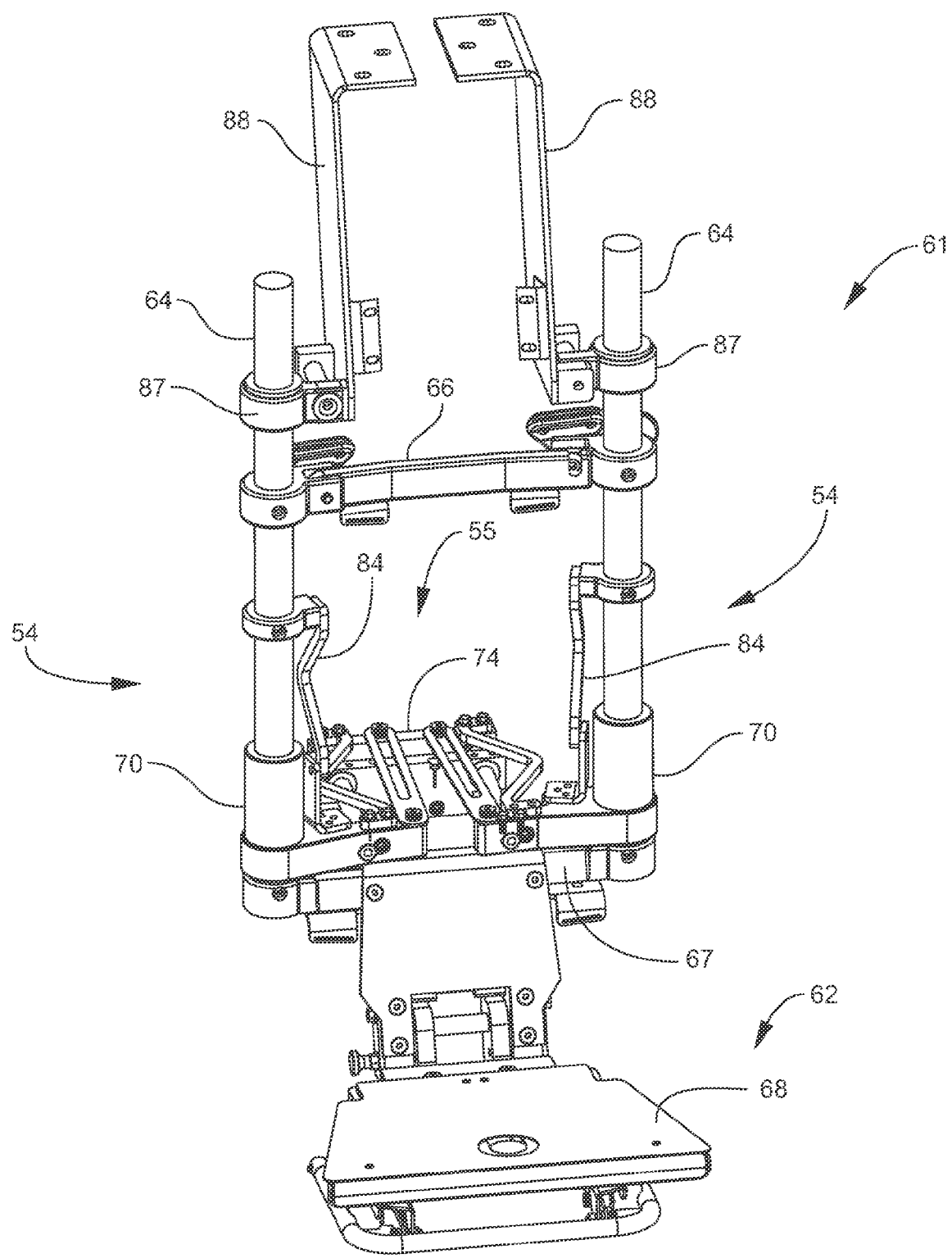
FIG. 8 is a front perspective view of another embodiment of an energy attenuating seat assembly with multi-axis energy attenuation.
Figure 9:
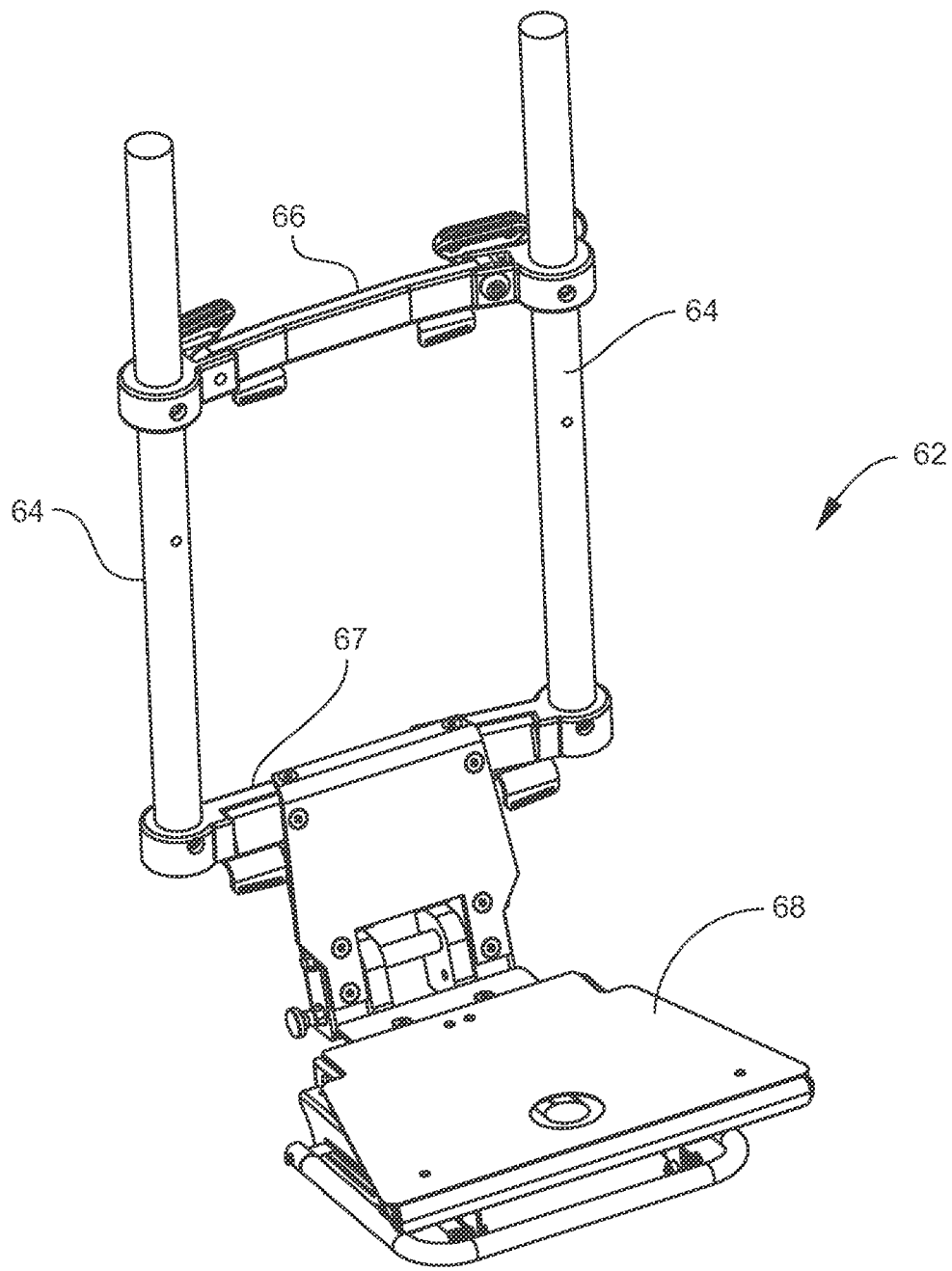
FIG. 9 is a front perspective view of the seat portion of the energy attenuating seat assembly of FIG. 8.

Another embodiment of an EA seat according to the instant invention is shown in FIGS. 8 through 12. An exemplary EA seat assembly 61 includes a seat 62, a vertical EA support 54, and a horizontal EA support 55. The seat 62, as best seen in FIG. 9, is a rigid structure comprising left and right tubular side members 64, upper and lower cross members 66, 67 and a seat pan 68. The tubular side members 64 are slidably received by left and right main bushings 70 located above the lower cross member 67.

Figure 11:
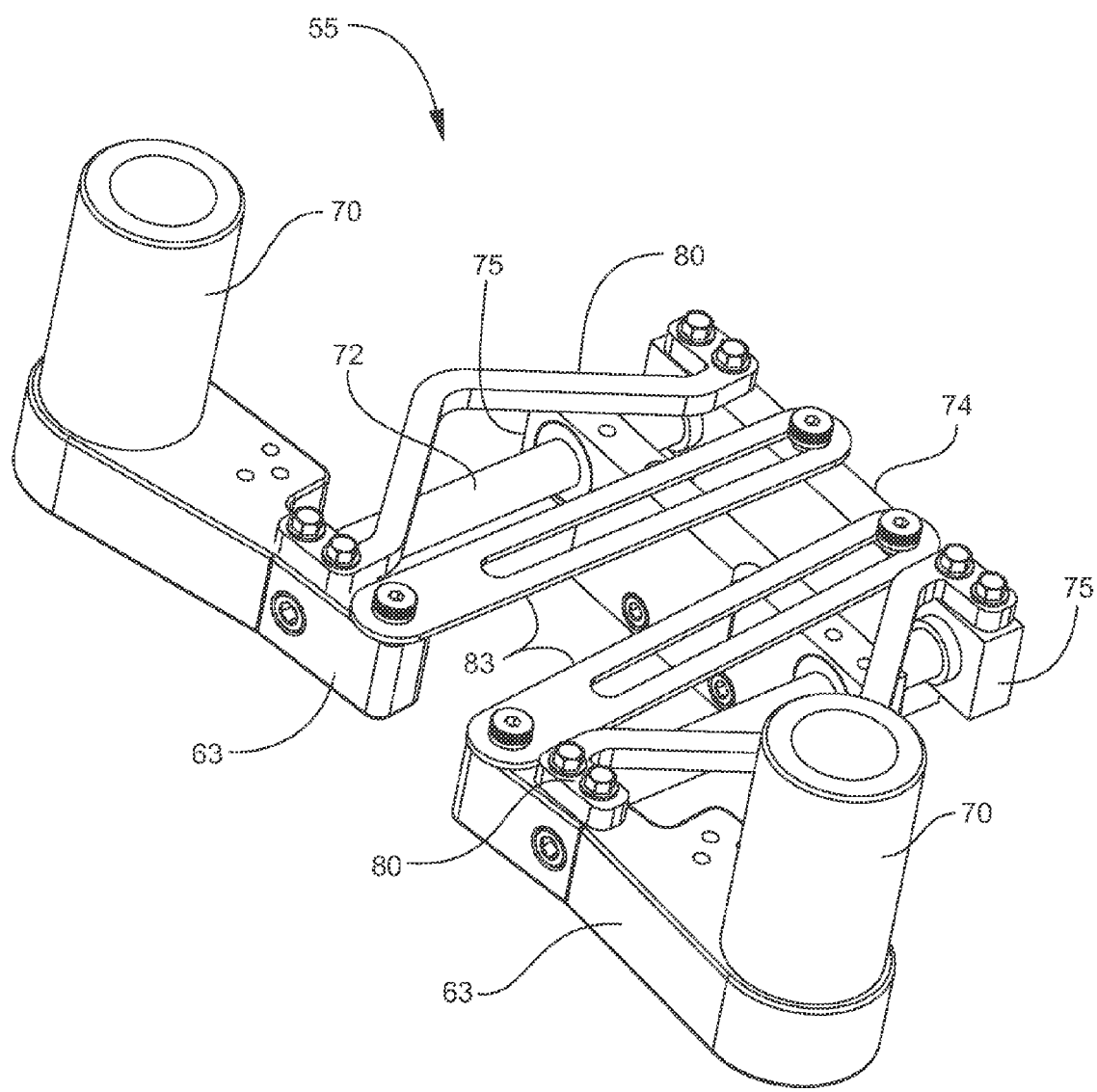
FIG. 11 is a top perspective view of an energy attenuating support of the seat assembly of FIG. 8.
Figure 12:
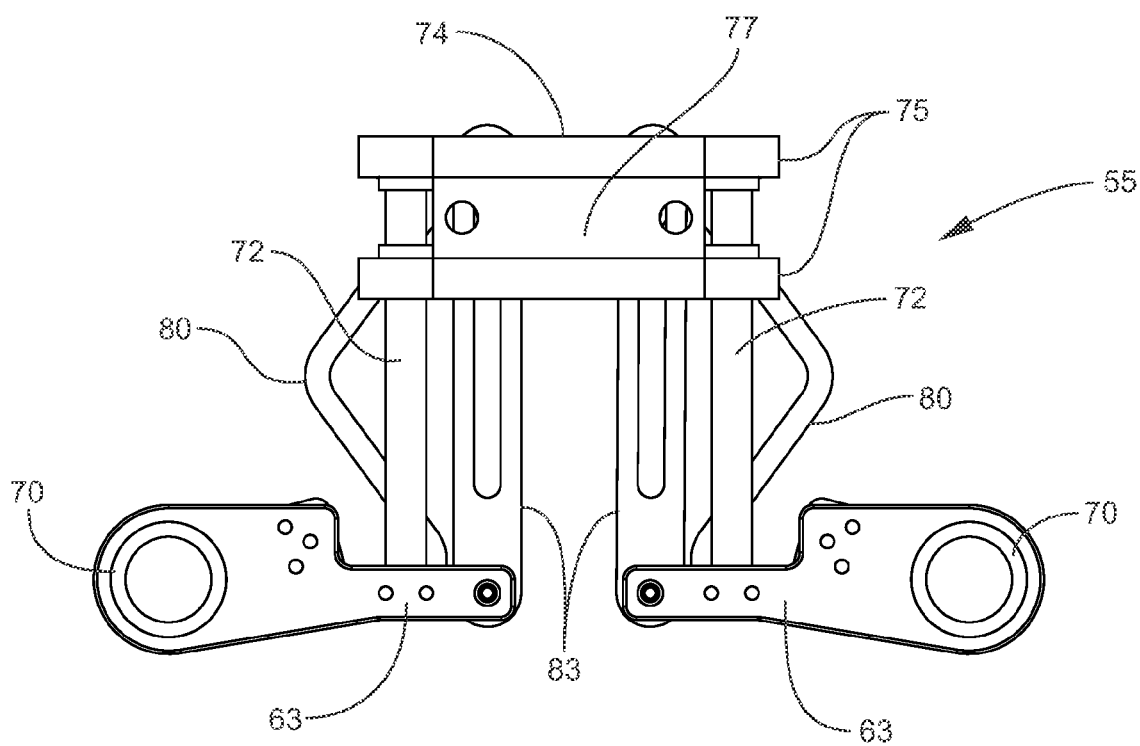
FIG. 12 is a bottom view of the energy attenuating support of FIG. 11.

Referring now particularly to FIGS. 11 and 12, horizontal slide rods 72 are each rigidly attached to, or integral with a flange portion 63 of the main bushings 70, and extend away from the bushings in a rearward direction. The other ends of the horizontal slide rods 72 are slidably received by the vertical wall portions 75 of a U-shaped guide block 74. The base portion 77 of guide block 74 includes holes for rigidly attaching the guide block to a suitable mounting surface of structure 2. The slide rods 72 sliding longitudinally in or out of guide block 74 thus accommodate longitudinal motion of seat 62. Together, the guide block 74, horizontal slide rods 72, and main bushings 70 comprise a horizontal seat guide portion of the horizontal EA support 55.

Horizontal EA support 55 further includes horizontal EA links 80. The EA links 80 are attached at one end to guide block 74, and at the other end to flange portions 63 of main bushings 70, preventing longitudinal relative motion between seat 62 and structure 2 under non-extreme conditions. Sliding extension limiters 83 prevent the horizontal slide rods 72 from disengaging with guide block 74. Under severe longitudinal impact conditions, horizontal EA links 80 deform in a controlled manner to absorb the imparted energy without injury to a seated occupant. EA links 80 may be two independent links as shown, or one link such as the diamond shaped link shown in FIG. 7. In addition, EA links 80 may comprise any of the designs and materials discussed in reference to the earlier described EA seat embodiments.

When the guide block 74 is mounted to the structure 2, it along with horizontal slide rods 72 and main bushings 70 create a structure that is fixed and rigid in a vertical direction. Vertical motion of seat 62 relative to the vertically supported main bushings 70 is enabled by sliding of the seat side members 64 through the bushings. The main bushings 70 and the seat side members 64 together serve as a vertical seat guide portion of the vertical EA support 74. The vertical EA support 74 further comprises vertical EA links 84, each connecting at one end to the seat side members 64, and at the other end to the main bushings 70. Thus under non-extreme operating circumstances, the EA links 84 act to vertically support the seat from the main bushings 70 and prevent vertical motion of the seat relative to the structure 2. Like the horizontal EA links 80, the vertical EA links 84 may comprise any of the designs and materials discussed in reference to the earlier described EA seat embodiments.

Figure 10:
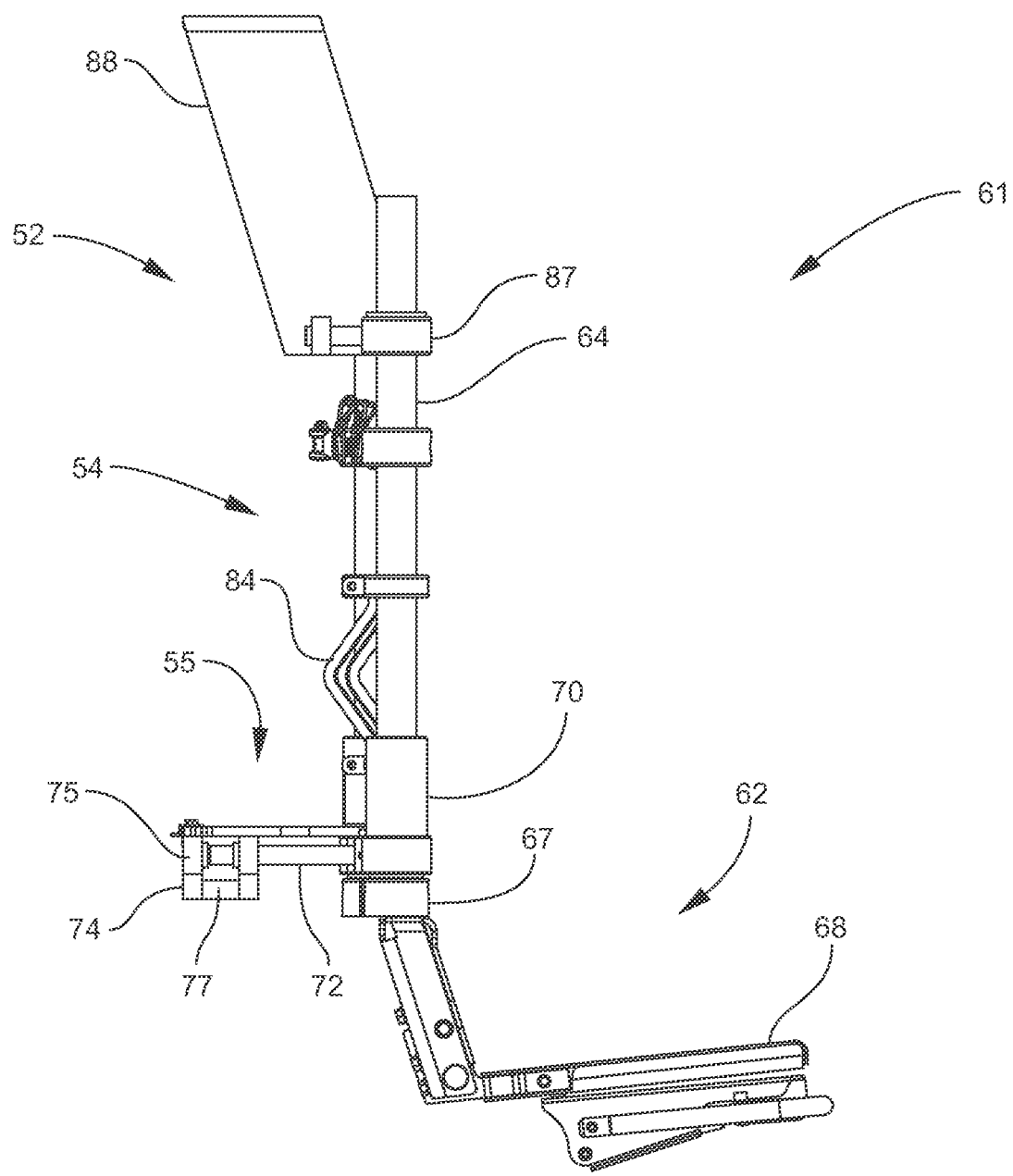
FIG. 10 is a side view of the energy attenuating seat assembly of FIG. 8.
Figure 13:
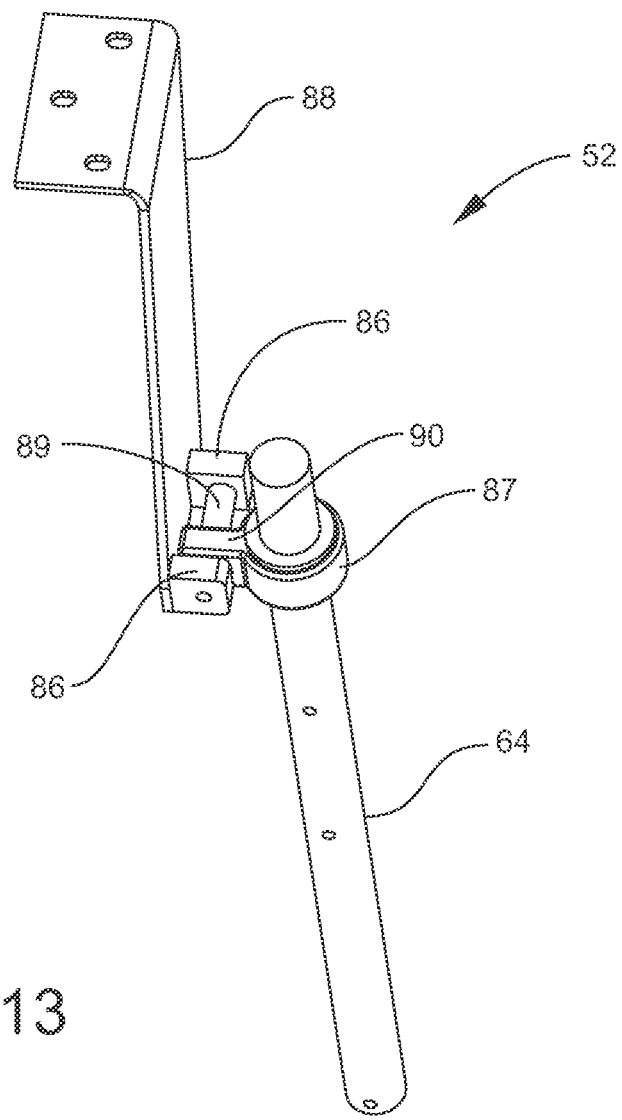
FIG. 13 is a perspective view of an upper seat support assembly portion of the seat assembly of FIG. 8.

Referring to FIGS. 8, 10, and particularly FIG. 13, the seat assembly 61 may further comprise an upper seat support assembly 52 that provides lateral stability while allowing the upper end of seat to move in other directions. In one embodiment, collars 87 are disposed about the upper ends of side members 64 and adapted with suitable bushings or rollers to facilitate vertical sliding of the seat side members 64 relative thereto. Left and right upper seat support brackets 88 each extend from a first end attached to structure 2, to a second end proximate respective seat side members 64 and collars 87. An upper longitudinal guide rod 89 is supported between flanges 86 extending from each of seat support brackets 88 and juxtaposed with the collars 87. A flange portion 90 of collars 87 is disposed for sliding movement along the guide rod 89 between flanges 86, thereby allowing the upper end of seat 62 to move freely in a longitudinal direction over a limited range. Vertical motion of seat 62 is provided by the ability of the seat side members 64 to slide vertically relative to collars 87 and support brackets 88.

In addition to the constructions shown in FIGS. 3 through 13, the elements of the depicted seat assemblies may be arranged in various alternative ways with equal effect. For instance, in the embodiment of FIG. 3, the horizontal EA support 25 could be located higher or lower relative to the seat, than the position shown roughly proximate the lower back region of a seated occupant. In particular, the horizontal EA support could be located near or at the bottom of seat 23, or alternatively higher up, aligned with the middle or upper back of a seated occupant. If located higher for example, the vertical EA link 27 could be positioned below the horizontal EA support 25 to provide adequate stroking distance. Similarly, the vertical positioning of the horizontal EA support 55 of the embodiment beginning with FIG. 8 may be higher or lower than depicted without an adverse effect on operation of the seat assembly.

Further, various elements of the disclosed embodiments may be substituted for one another. For example, continuing with the embodiment of FIG. 3, instead of the horizontal EA support 25 comprising an assembly located behind the seat, horizontal EA capability could be achieved by adapting a construction similar to vertical EA support 24 underneath the seat. More specifically, the seat could be guided by under-seat bushings on a guide rail that extends longitudinally from under the seat to structure 2 aft of the seat; and include EA links such as EA links 27 or 42 mounted under the seat in a parallel relationship to the guide rail. Alternatively, self-contained EA supports such as EA support 25 that are separate from the seat itself could be adapted to provide both vertical and horizontal support. For example, the vertical EA support 24 could be replaced with a version of horizontal EA support 25 oriented vertically and extending either upward or downward from the seat to structure 2.

In another alternative arrangement, elements of one disclosed embodiment could be adapted for use in another disclosed embodiment. For example, the horizontal EA support 55 of the embodiment beginning with FIG. 8 could be adapted to replace horizontal EA support 24 in the embodiment beginning with FIG. 3. More specifically, the slide rods 72 of EA support 55 could be rigidly attached to, or integral with the seat guide rail 28 of seat assembly 2, along with EA links 80 and extension limiters 83. As in seat assembly 61, the horizontal EA support 55 via slide rods 72 would serve to vertically fix and support the fixed portion of the vertical seat guide, in this case the seat guide rail 28. The upper end of guide rail 28 could then be unsupported, or guided using an arrangement such as upper seat support assembly 52 shown in FIG. 13.

Figure 14:
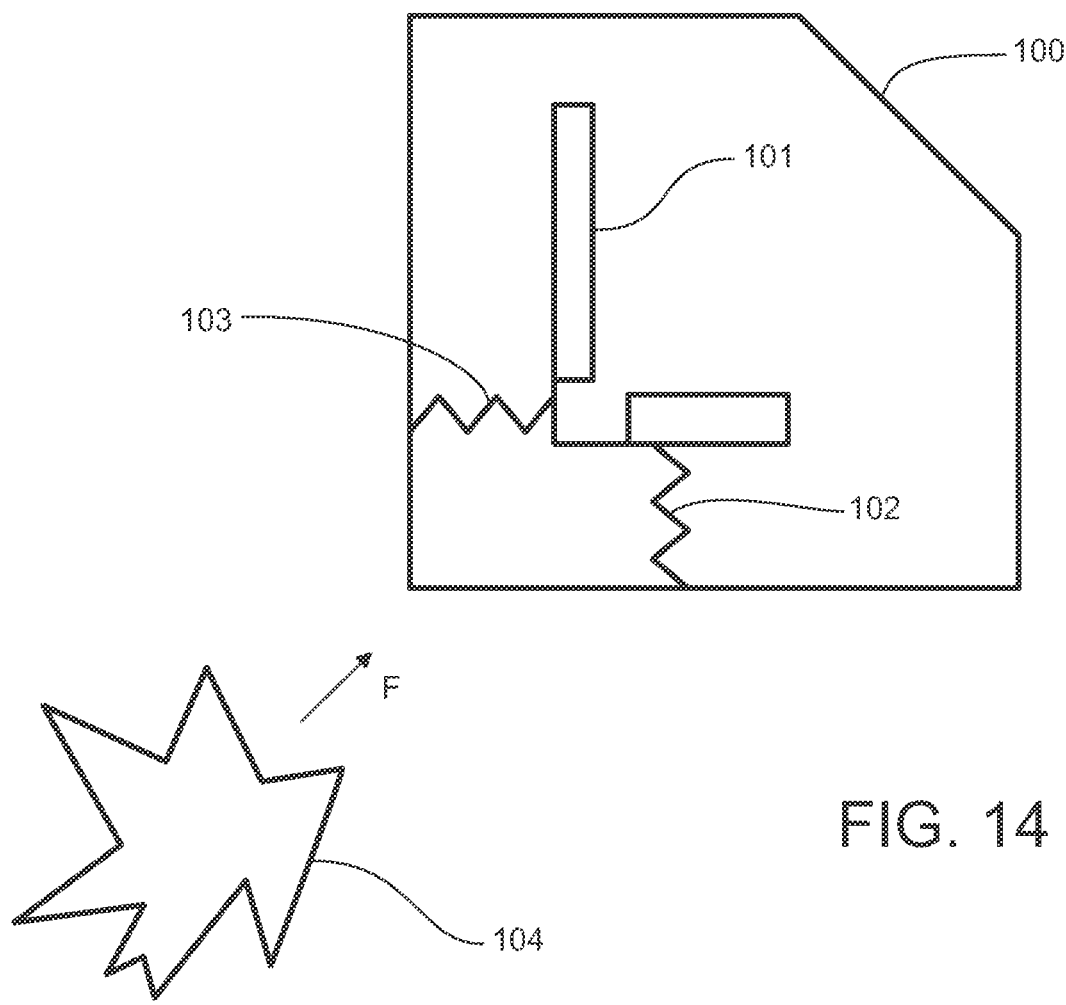
FIG. 14 is a schematic representation of a multi-axis energy attenuating seat proximate a non-vertical external force.

In a generally vertically directed loading event, such as a helicopter crash, or a slam down associated with an under vehicle mine blast, the EA seat of the present invention strokes downward in a guided manner as the vertical EA link deforms and absorbs the imparted energy. If the shock load event is not purely vertical, and contains a longitudinal component, the load will be shared by the vertical and horizontal EA supports. FIG. 14 depicts such an event in which a compartment 100 containing a seat 101 supported by vertical and horizontal EA supports 102, and 103 respectively, is impacted at an angle from beneath and behind by an explosive blast 104. The resultant non-vertical load 'F' acts to accelerate the compartment forward and upward relative to the seat 101. The acceleration is reacted by the inertia of the seat and occupant, driving the seat simultaneously downward and rearward relative to the compartment, and engaging the horizontal EA support 103 as well as the vertical EA support 102. The EA supports will both simultaneously displace as required to absorb the vertical and horizontal components of the imparted load.

The EA links may be custom tailored to any particular use by modifying their material properties, thicknesses, and/or shapes. In one exemplary implementation, the EA seat assembly may attenuate a vertical impact of a 6.5 meters-per-second impulse due to mine blast or improved explosive device (IED). The exemplary EA seat assembly may also be capable of withstanding road shock loads transmitted through a vehicle chassis structure of at least 10 G's vertical, and 8 G's longitudinal. In other exemplary embodiments, the EA seating assembly may incorporate other or additional known energy attenuation links or devices. Although the EA links may protect the occupant for multiple impact events, they are generally considered disposable and easily replaced to restore a maximum level of protection to the EA seat assembly.

Figure 15:
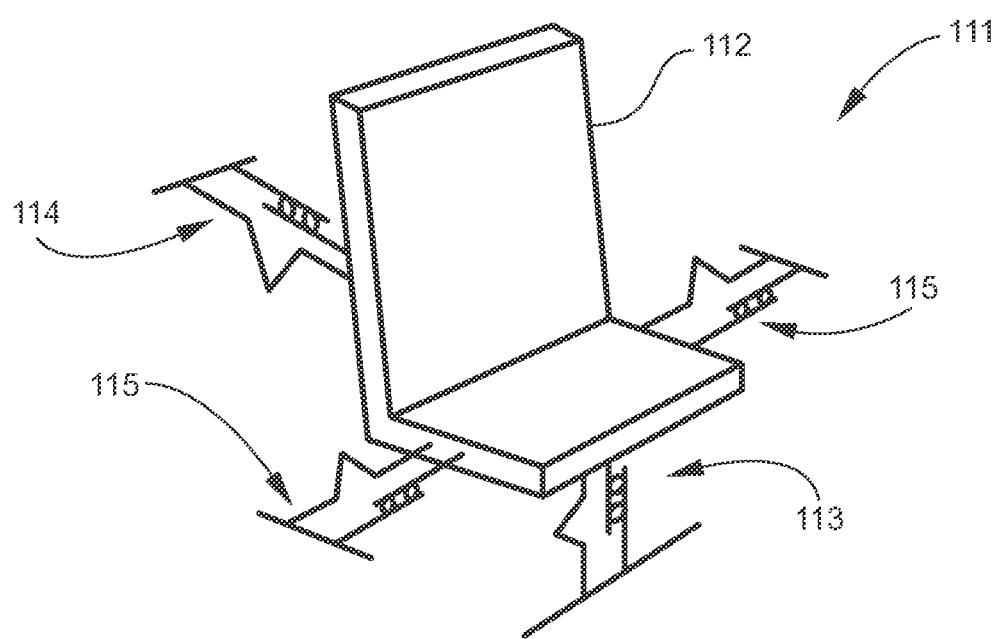
FIG. 15 is a schematic representation of a multi-axis energy attenuating seat with three-dimensional energy attenuation capability.

Although the previously described embodiments comprise seats with EA mechanisms arranged in two generally orthogonal directions, it should be appreciated that an EA seat assembly in accordance with the instant invention is not so limited, and may include EA mechanisms operative in more than two directions. For example, an EA mechanism such as the above described horizontal EA supports could be adapted to provide lateral EA attenuation in combination with longitudinal and vertical EA support mechanisms. FIG. 15 schematically depicts one such multi-axis EA seat assembly 111 supported by a vertically oriented EA support 113, a horizontally oriented EA support 114, and opposed lateral EA supports 115 on either side of a seat 112. The lateral EA supports 115 connect directly or indirectly at one end to the seat or to a fixed portion of the vertical or horizontal seat guides 113, 114, and at the other end to structure 2. The lateral EA supports 115 may be of any suitable construction, including the constructions of the horizontal EA supports described in reference to the earlier disclosed embodiments. The addition of one or both lateral EA supports 115 gives seat assembly 111 three-dimensional energy attenuation capability as compared with the two-dimensional capability of the previously described embodiments.

For the purposes of describing and defining the present invention it is noted that the use of relative terms, such as "substantially", "generally", "approximately", and the like, are utilized herein to represent an inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

Exemplary embodiments of the present invention are described above. No element, act, or instruction used in this description should be construed as important, necessary, critical, or essential to the invention unless explicitly described as such. Although only a few of the exemplary embodiments have been described in detail herein, those skilled in the art will readily appreciate that many modifications are possible in these exemplary embodiments without materially departing from the novel teachings and advantages of this invention. Accordingly, all such modifications are intended to be included within the scope of this invention as defined in the appended claims.

In the claims, any means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. Unless the exact language "means for" (performing a particular function or step) is recited in the claims, a construction under §112, 6th paragraph is not intended. Additionally, it is not intended that the scope of patent protection afforded the present invention be defined by reading into any claim a limitation found herein that does not explicitly appear in the claim itself.

What is claimed is:

1. An energy attenuating seat assembly, comprising:
    a seat with a back;
    a first energy attenuating support comprising a first seat guide and a first energy attenuating link, the first energy attenuating support operatively disposed in a first direction generally aligned with the seat back; and
    a second energy attenuating support comprising a second seat guide and a second energy attenuating link, the second energy attenuating support operatively disposed in a second direction generally orthogonal to the first direction, wherein the first and second energy attenuating links comprise crushable metal bars with at least one bend.

2. The energy attenuating seat assembly of claim 1, wherein the second direction is substantially perpendicular to the seat back.

3. The energy attenuating seat assembly of claim 1, wherein the first and second seat guides each comprise a moveable portion that moves with the seat, and a fixed portion adapted for attachment to a structure external to the seat.

4. An energy attenuating seat assembly in a vehicle compartment, comprising:
    a seat with a back;
    a first energy attenuating support connected to the seat and comprising a first seat guide and a first energy attenuating link, the first energy attenuating support operatively disposed in a generally vertical direction; and
    a second energy attenuating support connected to the seat and comprising a second seat guide and a second energy attenuating link, the second energy attenuating support operatively disposed in a generally horizontal and rearward direction from the seat back to a surface of the vehicle compartment, wherein the first and second energy attenuating links comprise crushable metal bars with at least one bend.

5. The energy attenuating seat assembly of claim 4, wherein the first and second seat guides each comprise a moveable portion that moves with the seat and slidably engages a fixed portion adapted for attachment to the vehicle compartment.

6. A vehicle mounted seat, comprising:
    a first energy attenuating support comprising a first seat guide and a first energy attenuating link, the first seat guide having a fixed portion connected to the vehicle, and moveable portion that moves with the seat in a first direction; and
    a second energy attenuating support comprising a second seat guide and a second energy attenuating link, the second seat guide having a fixed portion connected to the vehicle, and a moveable portion connected to the fixed portion of the first seat guide, wherein the second energy attenuating link provides a connection between the vehicle at one end, and the fixed portion of the first seat guide at the other end.

7. The energy attenuating seat assembly of claim 3, wherein the moveable portion of the first seat guide comprises elongated portions of the seat back.

8. The energy attenuating seat assembly of claim 7, wherein the elongated portions of the seat back comprise tubular seat side members, and the fixed portion of the first seat guide comprises main bushings that slidably receive the tubular side members.

9. The energy attenuating seat assembly of claim 8, wherein the moveable portion of the second seat guide is connected to the main bushings.

10. The energy attenuating seat assembly of claim 1, further comprising an upper seat support bracket connected to an upper portion of the seat back.

11. The energy attenuating seat assembly of claim 5, wherein the moveable portion of the first seat guide comprises elongated portions of the seat back.

12. The energy attenuating seat assembly of claim 11, wherein the elongated portions of the seat back comprise tubular seat side members, and the fixed portion of the first seat guide comprises main bushings that slidably receive the tubular side members.

13. The energy attenuating seat assembly of claim 12, wherein the moveable portion of the second seat guide is connected to the main bushings.

14. The energy attenuating seat assembly of claim 4, further comprising an upper seat support bracket connected to an upper portion of the seat back.

* * * * *